(12) United States Patent
Sudhi

(10) Patent No.: US 9,075,871 B2
(45) Date of Patent: Jul. 7, 2015

(54) TECHNIQUE TO CLASSIFY DATA DISPLAYED IN A USER INTERFACE BASED ON A USER DEFINED CLASSIFICATION

(75) Inventor: Suraj Sudhi, Kerala (IN)

(73) Assignee: SAP SE, Walldorf (DE)

(*) Notice: Subject to any disclaimer, the term of this patent is extended or adjusted under 35 U.S.C. 154(b) by 1241 days.

(21) Appl. No.: 12/343,493

(22) Filed: Dec. 24, 2008

(65) Prior Publication Data

US 2010/0161694 A1    Jun. 24, 2010

(51) Int. Cl.
*G06F 17/30* (2006.01)

(52) U.S. Cl.
CPC .... *G06F 17/30707* (2013.01); *G06F 17/30716* (2013.01)

(58) Field of Classification Search
CPC .......................... G06F 17/30106; G06F 17/301
USPC .......................................................... 707/706
See application file for complete search history.

(56) References Cited

U.S. PATENT DOCUMENTS

| | | | |
|---|---|---|---|
| 6,272,484 B1 * | 8/2001 | Martin et al. ........................ | 1/1 |
| 6,631,360 B1 * | 10/2003 | Cook ............................... | 706/20 |
| 6,631,496 B1 * | 10/2003 | Li et al. ......................... | 715/200 |
| 7,167,901 B1 * | 1/2007 | Beadle et al. ................. | 709/207 |
| 7,203,909 B1 * | 4/2007 | Horvitz et al. ................ | 715/765 |
| 7,801,864 B2 * | 9/2010 | Prahlad et al. ............... | 707/667 |
| 8,688,521 B2 * | 4/2014 | Broder et al. ............. | 705/14.71 |
| 2002/0169743 A1 * | 11/2002 | Arnold et al. ..................... | 707/1 |
| 2005/0193029 A1 * | 9/2005 | Rom et al. .................... | 707/200 |
| 2005/0204276 A1 * | 9/2005 | Hosea et al. ................ | 715/501.1 |
| 2006/0036966 A1 * | 2/2006 | Yevdayev ..................... | 715/779 |
| 2007/0244921 A1 * | 10/2007 | Blair ............................. | 707/102 |
| 2007/0255712 A1 * | 11/2007 | Mahoney et al. ................. | 707/9 |
| 2008/0027940 A1 * | 1/2008 | Canning et al. ................... | 707/9 |
| 2009/0150265 A1 * | 6/2009 | Keld ................................ | 705/30 |
| 2009/0164416 A1 * | 6/2009 | Guha .............................. | 707/2 |
| 2010/0100607 A1 * | 4/2010 | Scholz et al. ................ | 709/219 |

OTHER PUBLICATIONS

Microsoft Corporation; Use Favorites to Get Around the Web—Published: Mar. 26, 2003 | Updated: Aug. 23, 2006 (http://www.microsoft.com/windows/ie/ie6/using/howto/share/favorites.mspx).

* cited by examiner

*Primary Examiner* — Noosha Arjomandi

(57) ABSTRACT

Disclosed are methods and systems for classifying data displayed in a user interface based on a user defined classification and generating the user interface to display the data based on the user defined classification. The method includes importing a folder structure from a folder structure container wherein the folder structure depicts a user defined classification of the data. The data displayed in the user interface is mapped to a folder in the folder structure and a user interface object in the user interface is created for the folder. Furthermore, the mapped data is presented in the user interface object.

16 Claims, 8 Drawing Sheets

| HOME | NEWS |
|---|---|

NEWS BY COMPANY | NEWS BY INDUSTRY | ECONOMY | INFOTECH

AUTO | BANKING/FINANCE | CONS. PRODUCTS | ENERGY | IND'L GOODS / SVS | HEALTHCARE / BIOTECH | SERVICES

CRICKET: ENGLAND MAKE 316 IN FIRST INDIA TEST
12 DEC 2008, 1331 HRS IST

ENGLAND WERE BOWLED OUT FOR 316 IN THEIR FIRST INNINGS 37 MINUTES AFTER LUNCH ON THE SECOND DAY OF THE FIRST TEST AGAINST INDIA AT THE CHIDAMBARAM STADIUM.

INDIAN SPINNERS REDUCE ENGLAND TO 294/8
12 DEC 2008, 1243 HRS IST

INDIAN SPINNERS HARBHAJAN SINGH AND AMIT MISHRA REDUCED ENGLAND TO 294 FOR EIGHT WICKETS IN THE FIRST INNINGS AT LUNCH ON THE SECOND DAY OF THE FIRST CRICKET TEST AT THE M A CHIDAMBARAM STADIUM.          ALL NEWS BY INDUSTRY HEADLINES >>

| MARKET ANALYSIS | STOCK TO BUY | RESEARCH |
|---|---|---|

□ DEFTY FUTURES FAIL TO SPARKLE ON DEBUT
□ COS MAY TAP BOND MARKET TO BEAT CREDIT SQUEEZE
□ LOW DEBT-EQUITY RATIO NO CUSHION AGAINST BEARS
□ CROSS-MARGINING WINDOW UNLIKELY TO REVIVE ARBITRAGE ACTIVITY FOR NOW
□ MARKET SLIDE FORCES COS TO GIVE MORE SHARES
                                                      MORE >>

TATA SKY+
PAUSE, RECORD & REWIND LIVE TV. EXPERIENCE THE REVOLUTION NOW!
WWW.TATASKYPLUS.COM

BEST LIFE INSURANCE
COMPARE PRU, BAJAJ, TATA, LIC & MORE & CHOOSE THE BEST LIFE INSURANCE!
BIMADEALS.IN/BEST-LIFE-INSURANCE

AUTO
□ YOUR CAR MAY BECOME COSTLIER
□ VE COMMERCIAL VEHICLES CUTS PRICES BY UP TO 2 LAKH
□ CAR SALES FALL 19%, WORST IN 8 YEARS

FIG. 1

HOME | NEWS | MY NEWS | TECH NEWS
ECONOMY | AUTO | FOREIGN TRADER | SEARCH

CRICKET: ENGLAND MAKE 316 IN FIRST INDIA TEST
12 DEC 2008, 1331 HRS IST

ENGLAND WERE BOWLED OUT FOR 316 IN THEIR FIRST INNINGS 37 MINUTES AFTER LUNCH ON THE SECOND DAY OF THE FIRST TEST AGAINST INDIA AT THE CHIDAMBARAM STADIUM.

INDIAN SPINNERS REDUCE ENGLAND TO 294/8
12 DEC 2008, 1243 HRS IST

INDIAN SPINNERS HARBHAJAN SINGH AND AMIT MISHRA REDUCED ENGLAND TO 294 FOR EIGHT WICKETS IN THE FIRST INNINGS AT LUNCH ON THE SECOND DAY OF THE FIRST CRICKET TEST AT THE M A CHIDAMBARAM STADIUM.          ALL NEWS BY INDUSTRY HEADLINES >>

AUTO
□ YOUR CAR MAY BECOME COSTLIER
□ VE COMMERCIAL VEHICLE CUTS PRICES BY UP TO 2 LAKH
□ CAR SALES FALL 19%, WORST IN 8 YEARS

| MARKET ANALYSIS | STOCK TO BUY | RESEARCH |

□ DEFTY FUTURES FAIL TO SPARKLE ON DEBUT
□ COS MAY TAP BOND MARKET TO BEAT CREDIT SQUEEZE
□ LOW DEBT-EQUITY RATIO NO CUSHION AGAINST BEARS
□ CROSS-MARGINING WINDOW UNLIKELY TO REVIVE ARBITRAGE ACTIVITY
□ MARKET SLIDE FORCES COS TO GIVE MORE SHARES
                                          MORE >>

TATA SKY+
PAUSE, RECORD & REWIND LIVE TV. EXPERIENCE THE REVOLUTION NOW
WWW.TATASKYPLUS.COM

BEST LIFE INSURANCE
COMPARE PRU, BAJAJ, TATA, LIC & MORE & CHOOSE THE BEST LIFE INSURANCE
BIMADEALS.IN/BEST-LIFE-INSURANCE

FIG. 3

| HOME | NEWS | MY NEWS | TECH NEWS |
| ECONOMY | AUTO | FOREIGN TRADER | SEARCH |

YOUR CAR MAY BECOME COSTLIER
12 DEC 2008, 0706 HRS IST, CHANCHAL PAL CHAUHAN

CUSTOMERS MAY END UP PAYING MORE FOR BUYING CARS DESPITE THE 4% CUT IN EXCISE DUTY BY THE CENTRAL GOVERNMENT. BEST CARS TO OWN AND DRIVE | REBATES BEING OFFERED

VE COMMERCIAL VEHICLES CUTS PRICES BY UP TO RS 2 LAKS
12 DEC 2008, 1646 HRS IST

VE COMMERCIAL VEHICLES, A JOINT VENTURE BETWEEN EICHER MOTORS AND SWEDISH MAJOR VOLVO, TODAY SLASHED THE PRICES OF ITS PRODUCTS BY UP TO RS 2 LAKHS ON ACCOUNT OF FOUR PER CENT REDUCTION IN CENVAT

ALL NEWS BY INDUSTRY HEADLINES >>

AUTO MANIA

MAHINDRA & MAHINDRA DENIES VOLVO BID
UTILITY VEHICLE MANUFACTURE M&M DENIED MEDIA REPORTS THAT IT WAS CONSIDERING A JOINT BID WITH PRIVATE-EQUITY FIRMS FOR VOLVO CAR CORP, A UNIT OF FORD.

☐ DOUBLE WHAMMY OF JOB LOSS, TERROR FEARS FOR AUTO INDUSTRY
☐ GM SLASHES PRICES BY UP TO RS 30,500
☐ NOV CAR SALES DOWN 19.4 PC Y/Y - INDUSTRY

MORE >>

| MARKET ANALYSIS | STOCK TO BUY | RESEARCH |

☐ DEFTY FUTURES FAIL TO SPARKLE ON DEBUT

FIG. 4

| HOME | NEWS | MY NEWS | TECH NEWS | — 505

HARDWARE | SOFTWARE | SEARCH

GOOGLE 'HERO' NISHAR TO JOIN LINKEDIN
12 DEC 2008, 1133 HRS IST

DIPCHAND NISHAR, AN INDIAN AMERICAN ENGINEER WHO HELPED GOOGLE START ITS MOBILE BUSINESS, IS JOINING THE SOCIAL NETWORKING GROUP LINKEDIN TO HELP IT DEVELOP NEW PRODUCTS AND STRATEGIES.

GOOGLE RELEASES FINISHED VERSION OF CHROME BROWSER
12 DEC 2008, 0946 HRS IST

GOOGLE YANKED THE "BETA" TEST LABEL OFF CHROME, QUICKLY PUTTING A STAMP OF APPROVAL ON ITS WEB BROWSER RELEASED IN A DIRECT CHALLENGE TO MICROSOFT'S UBIQUITOUS INTERNET EXPLORER.

ALL INFOTECH HEADLINES >>

HARDWARE
▫ PC MAKER LENOVO IN TALK ON DEAL; ACER UPBEAT ON Q4
▫ INTEL, WIMAX FORUM TO BRING LOW COST WIMAX DEVICES TO INDIA
▫ HCL TECH TO CLOSE 441 MN POUNDS AXON DEAL

IT'S HOT

MORE MOBILE PHONE MAKERS BACK GOOGLE'S ANDROID
WORLD'S LARGEST MOBILE PHONE AND CHIP MAKERS SUPPORT THE ANDROID MOBILE DEVICE PLATFORM DEVELOPED BY GOOGLE INC.

▫ HCL TECH TO CLOSE 441 MN POUNDS AXON DEAL
▫ JIHADIST NEW TARGET, FACEBOOK
▫ 3I INFOTECH UNVEILS I-SERV FOR RURAL INDIA
MORE >>

MARKET ANALYSIS | STOCK TO BUY | RESEARCH
▫ DEFTY FUTURES FAIL TO SPARKLE ON DEBUT
▫ COS MAY TAP BOND MARKET TO BEAT CREDIT SQUEEZE
▫ LOW DEBT-EQUITY RATIO NO CUSHION AGAINST BEARS
▫ CROSS-MARGINING WINDOW UNLIKELY TO REVIVE ARBITRAGE ACTIVITY
▫ MARKET SLIDE FORCES COS TO GIVE MORE SHARES
MORE >>

TECHNIQUE TO CLASSIFY DATA DISPLAYED IN A USER INTERFACE BASED ON A USER DEFINED CLASSIFICATION

FIELD OF THE INVENTION

The invention generally relates to the field of generating user interfaces. More particularly, the invention relates to classifying data displayed in a user interface based on a user defined classification.

BACKGROUND OF THE INVENTION

Due to the large volume of the content available in information systems these days, there is a need to display the content to end users in a structured and intuitive way. For example, the information on a news website has to be classified before it can be displayed to the user. So, the news regarding software companies may appear under the category "News→Industry News By Industry→Infotech→Software" in a particular news website. In another news website, it may be classified as "News→Technology→Software". Such classifications however may not agree with a user's own preferences or interests. Therefore, it may be time consuming for the user to find the news of his interest in different websites.

While content classification is an important tool to manage complexity, very often it can become the source of further complexity to the end user. Consider another situation, wherein a company portal containing organizational information is migrated from one version to another or is frequently updated causing the information to be moved from one category to another. This causes inconvenience to the employees as they have to search for the information. The paucity of time available to employees does not allow them to spend time learning the content classification mechanism to use it effectively. As a result, inefficiency in information dissemination and productivity losses occur.

Personalization features available in the current user interfaces is typically limited to features such as changing the position of the user interface elements, changing the colors of the user interface elements, changing the font of the text and changing a type of the charts displayed. Basically, the personalization feature is just limited to the features that are provided by the user interface itself and cannot accommodate all preferences of a user.

SUMMARY OF THE INVENTION

Described are methods and systems for classifying data displayed in a user interface based on a user defined classification and generating the user interface to display the data based on the user defined classification. The method includes importing a folder structure from a folder structure container wherein the folder structure depicts a user defined classification of the data including any new user interface objects for displaying the data according to user preferences. The data displayed in the user interface is mapped to the folder structure, the user interface object in the user interface is created for the folder and the mapped data is presented in the user interface object.

The system includes a folder structure container having a folder structure depicting the user defined classification. An importing tool imports the folder structure and provides the folder structure to a mapping tool. The mapping tool extracts data objects containing the data displayed in the user interface and provides them to the user. The user may map the data objects to a folder in the folder structure and regenerate the user interface to display the mapped data according to the folder structure.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 1 is an exemplary screen display of a user interface displaying data such as news according to an embodiment of the invention.

FIG. 3 is an exemplary screen display of the user interface of FIG. 1 displaying the data based on the user defined classification according to an embodiment of the invention.

FIG. 4 is an exemplary screen display of the user interface of FIG. 1 displaying the data based on the user defined classification according to an embodiment of the invention.

FIG. 5 is an exemplary screen display of the user interface of FIG. 1 displaying the data based on the user defined classification according to an embodiment of the invention.

DETAILED DESCRIPTION

Figure 2:
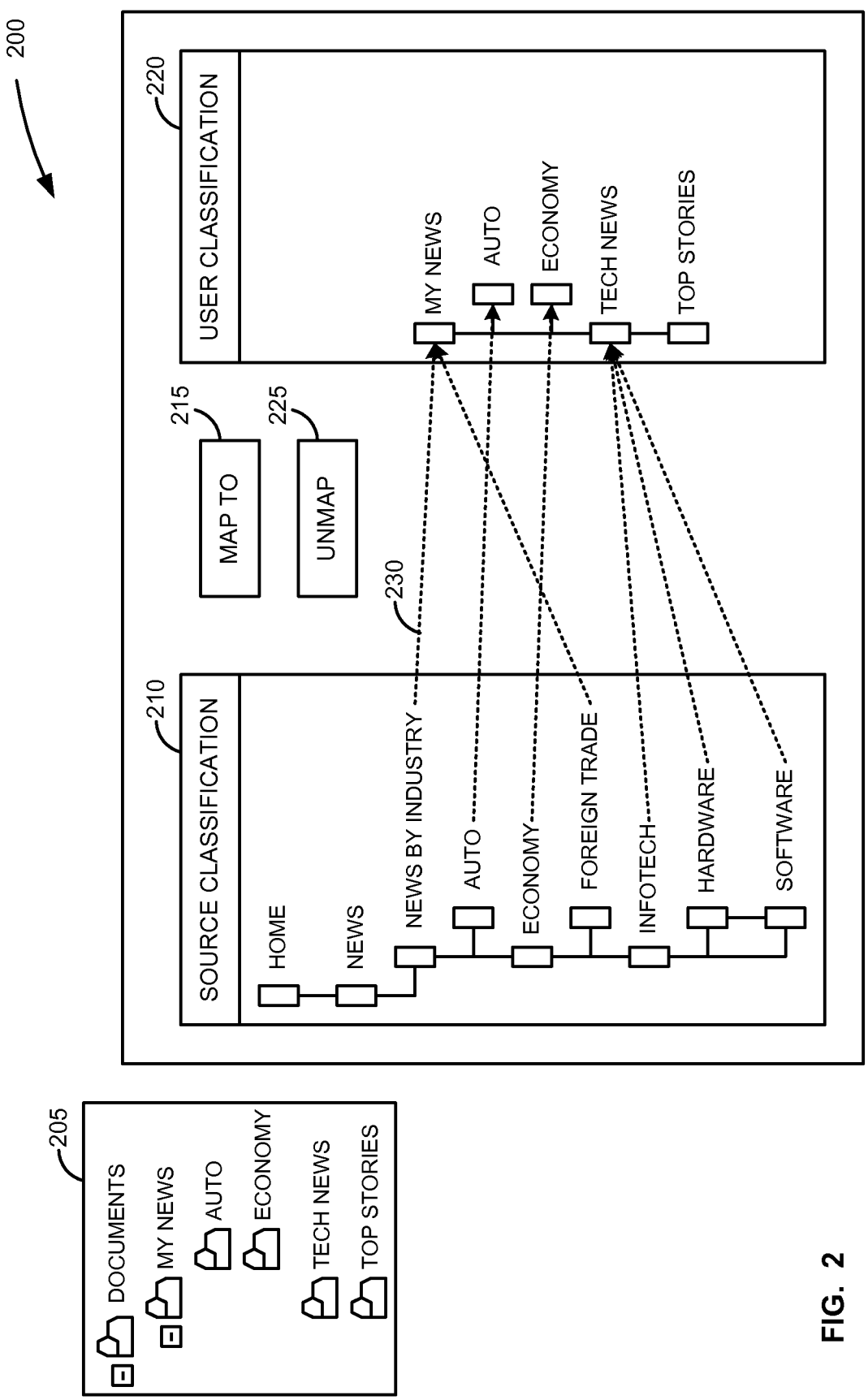
FIG. 2 is a mapping tool to map the data displayed in the user interface to a folder structure depicting the user defined classification according to an embodiment of the invention.

FIG. 1 is an exemplary screen display of a user interface, for example, a web page 100 displaying data such as news according to an embodiment of the invention. The web page 100 classifies the news in various categories displayed in first level tabs 105 such as "Home", and "News". The news displayed under category "News" is further classified into second level tabs 110 such as "News By Company", "News By Industry", "Economy", and "Infotech". Similarly, the news displayed under "News By Industry" are further classified into third level tabs 115 such as "Auto", "Banking/Finance", "Cons. Products", and "Energy". In the web page 100, news of the "News By Industry" category is displayed as news 120. If the user wishes to see the news in the "Auto" category, then the user may do so by navigating from "News→News By Industry→Auto". Similarly, the user may see the news under "Infotech" category by navigating from "News→Infotech".

The user may find it tedious or time consuming to navigate through three levels of tabs to find the news that is of interest to him. For example, to read the news under "Auto" category, the user has to navigate through all the three levels of tabs as follows: "News (first level tab 105)→News By Industry (second level tab 110)→Auto (third level tab 115)". The user may be interested in reading the news 120 quite often. So, the user may prefer to obtain it with as less navigation as possible. In order to do the above, the user may want to reclassify the news displayed in the web page 100 so as to read the news that is of interest to him in an easier way.

In an embodiment, the user may reclassify the information by creating bookmarks or links, for example, in the "Favorites" folder of a web browser. The user may create a link such as "Auto" in the "Favorites" folder and link to a uniform resource locator (URL) of the auto news presented in "News→News By Industry→Auto" category in web page 100. But the problem with this type of classification is that the "Auto" link would be available only in the system in which the link is created.

In another embodiment, the user could use a personalization feature in the user interface to organize the information. But, the personalization feature in the user interface is typically limited to features such as changing the position of tab controls, changing the color of tab controls, adding more tabs in the user interface by choosing from a list of tabs provided by the personalization feature, changing the font of the information, changing tab controls to tree control and changing the layout of the user interface. So the personalization feature may not allow the user to present the information displayed under a tab control in another tab control of his choice. For example, the personalization feature does not allow the user to present the news 120 displayed in "News→News By Industry→Auto" tab control in new tabs "My News→Auto".

FIG. 2 illustrates an exemplary mapping tool 200 to map data displayed in a user interface to a folder structure 205 depicting user defined classifications according to an embodiment of the invention. The folder structure 205 depicts an example of a user defined classification existing on a system such as the user's system or any other system. The user may have defined the folder structure 205 on the system to classify a set of files, for example, documents, reports, electronic mail and images in the system. The user may also use the folder structure 205 to classify content on a web page 100. The folder structure 205 may be defined in any application, for example, a file system in Microsoft® Windows, a file system in Linux, a file system in Unix, a file system in Solaris, and Microsoft® Outlook.

The mapping tool 200 displays the classification of the web page 100 according to a source classification 210 and folders from the folder structure 205 depicting the user classification 220. In an embodiment, the mapping tool 200 obtains source classification 210 by reading a user interface metadata file, for example, an extensible markup language (XML) file having the details of user interface objects of the web page 100. The user may map the classification from source classification 210 to the folders in user classification 220 using a "Map To" 215 button. The user may remove the mapping using the "Unmap" 225 button. In the mapping tool 200, the "News By Industry" classification from source classification 210 is mapped to "My News" folder in the user classification 220 as depicted by the mapping 230. The mapping 230 causes the news 120 displayed under "News→News By Industry" category in the web page 100 to now be displayed under the "My News" section of the user classification 220 in a newly generated web page. Similarly, the "News→News By Industry→Auto" classification is mapped to "My News→Auto", "News→Economy" to "MyNews→Economy", "News→Economy→Foregin Trade" to "MyNews", and "News→Infotech→Hardware", and "News→Infotech→Hardware" to "Tech News".

The source classification 210 has corresponding data objects provided by an application associated with the web page 100. The data objects contain the data to be displayed in the user interface. For example, "News→News By Industry" category has a corresponding data object news.newsByIndustry that contains the data, news 120. The data object is obtained by accessing an application programming interface of the application.

In one embodiment, when the folder structure 205 is imported in to the mapping tool 200, corresponding data objects are created for the mapped folders in the folder structure 205 to provide the data to be displayed in the reconfigured web page. After the data objects are created, the mapping is executed in the application by mapping the data object of a classification in the source classification 210 to the data object of the folder in user classification 220. For example, in the mapping 230, news.newsByIndustry data object is mapped to the newly created "My News" data object. The tab objects in the user interface obtain the data to be displayed in the user interface from the data objects. Obtaining news 120 from a URL is not always reliable because, if the classification of news 120 in the user interface changes, the URL of the news 120 also changes. For example, if the original URL of news 120 under classification "News→News By Industry" is "http://timesofworld.com/news/newsbyindustry/index.html" and the classification changes to "News→World→News By Industry", the URL may also change to "http://timesofworld.com/world/news/newsbyindustry/index.html". This makes the original URL obsolete. This problem can be eliminated by obtaining the data from the data object instead of the URL.

FIG. 3 is an exemplary screen display of a "My News" web page 300 displaying the data based on the user classification 220 of FIG. 2 according to an embodiment of the invention. The tabs "My News" 315 and "Tech News" 320 in first level tabs 305 and a second level tabs 310 are created based on a classification defined by the user in user classification 220. The first level tabs 305 and second level tabs 310 correspond to the folders in the user classification 220. The tab "My News" 315 corresponds to "My News" folder, and tab "Tech News" 320 to "Tech News" folder in the user classification 220. The tabs "Economy" and "Auto" appearing in the second level tabs 310 of tab "My News" 315 correspond to the folders "Economy" and "Auto" under the folder "My News" in the user classification 220. A new tab "Foreign Trade" is created in the second level tabs 310 since "News→Economy→Foreign Trade" classification in source classification 210 is also mapped to "My News" in the user classification 220.

A user interface object is created for the mapped folders in the user classification 220. For example, the tab "My News" 315 is created for the folder "My News". The user interface object represents the user defined classification in "My News" web page 300. The user interface object has the name of the folder it is created for.

Because of the mapping 230, the tab "My News" 315 displays news 325 same as news 120 since "News By Industry" in source classification 210 is mapped to "My News" folder in user classification 220. The tab "My News" 315 obtains the news 325 from the data object "My News". The tabs "My News→Economy" and "My News→Foreign Trade" in the "My News" web page 300 displays the news originally displayed under "News→Economy", and "News→Economy→Foreign Trade" respectively in the web page 100.

In an embodiment, the folder "My News" in user classification 220 is created as a "My News" 315 tab in "My News"

web page 300. In another embodiment, the folder "My News" may be created as a node in a tree hierarchy, or an item in the menu based on how the classifications are originally displayed in the web page 100.

FIG. 4 is an exemplary screen display of the auto news web page 400. The tab "My News→Auto" displays the auto news originally displayed under "News→News By Industry→Auto" in the web page 100.

FIG. 5 is an exemplary screen display of "Tech News" web page 500 displaying the data based on the user classification 220 according to an embodiment of the invention. The tab "Tech News" 505 corresponds to "Tech News" folder in the user classification 220. The tabs "Hardware" and "Software" in the second level tabs 510 correspond to "News→Infotech→Hardware" and "News→Infotech→Software" in source classification 210. Though the folders "Hardware" and "Software" do not exist under the "Tech News" folder in user classification 220, the tabs "Hardware" and "Software" are created under tab "Tech News" 505 since "News→Infotech→Hardware" and "News→Infotech→Software" are mapped to "Tech News" in the user classification 220.

The tabs "Tech News→Hardware" and "Tech News→Software" in the "Tech News" web page 500 display the news originally displayed under "News→Infotech→Hardware" and "News→Infotech→Software", respectively in web page 100.

Figure 6:
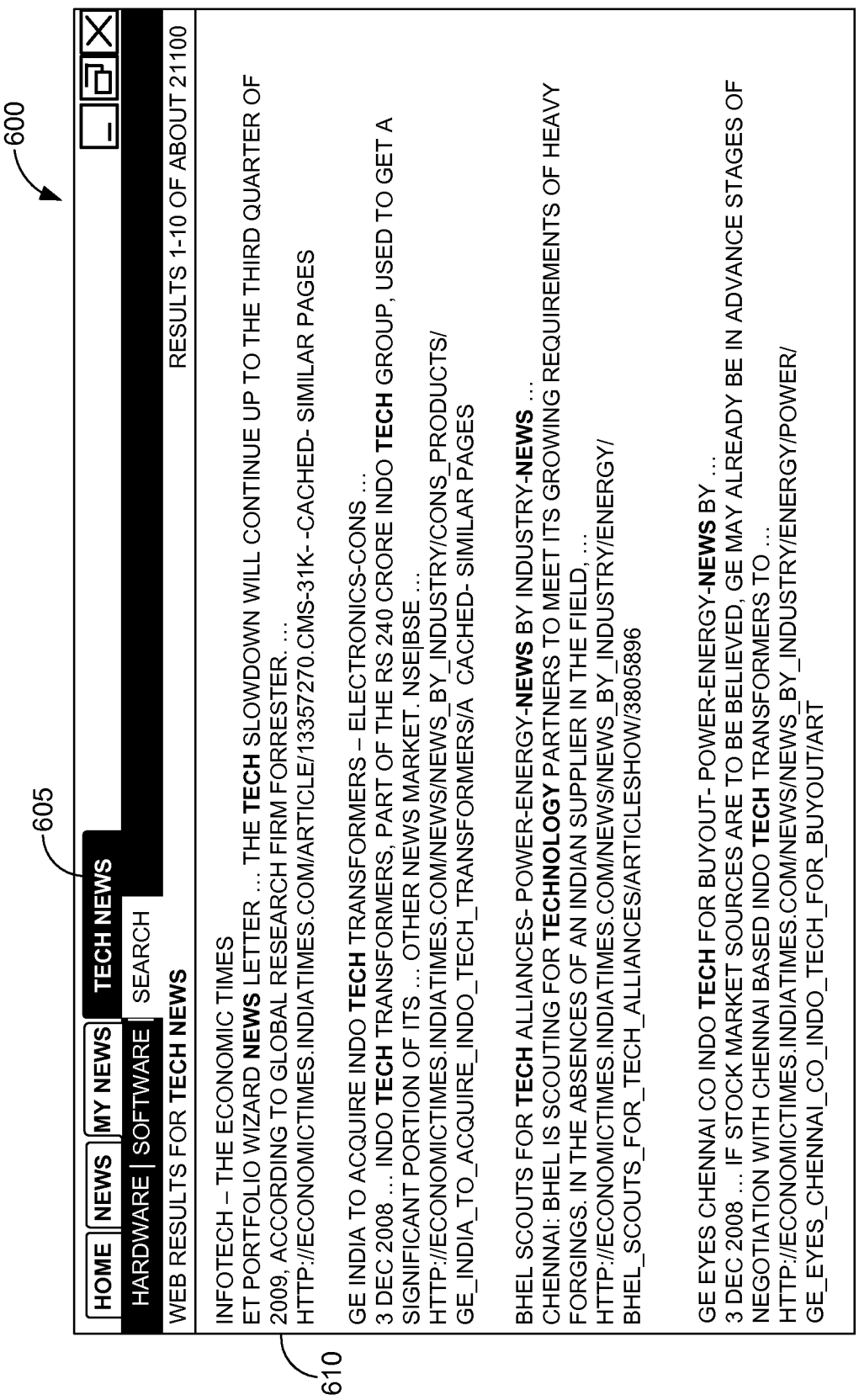
FIG. 6 is an exemplary screen display of the user interface of FIG. 1 displaying the data based on the user defined classification according to an embodiment of the invention.

FIG. 6 is an exemplary screen display of a search web page 600 that displays search results 610 of a search performed in an application using the tab name as a search keyword according to an embodiment of the invention. In the search web page 600, when the user selects the tab "Search", a search is performed to retrieve the news related to or containing the keyword "tech news", which is the name of the tab "Tech News" 605. The search is performed automatically with tab name as the keyword. In an embodiment, the search is performed within the application. In another embodiment, the search may be performed outside the application. Also, the search may be performed using the search engine of the application or any external search engines such as the one provided by Google®, of Mountainview, Calif.

Figure 7:
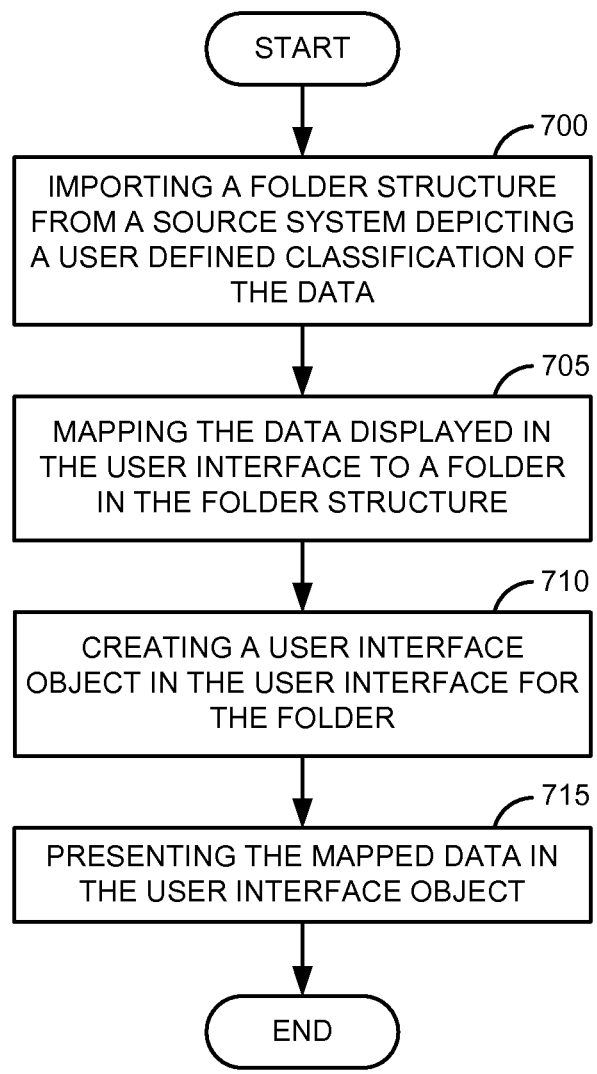
FIG. 7 is a flow diagram for classifying data displayed in a user interface based on a user defined classification according to an embodiment of the invention.

FIG. 7 is a flow diagram for classifying data displayed in a user interface based on a user defined classification according to an embodiment of the invention. At process block 700, a folder structure 205 is imported from a system, for example, the user's system. The folder structure 205 may be imported from an application such as Microsoft® Windows and Microsoft® Outlook. All the folders under the folder imported by the user are considered for user classification 220. For example, in folder structure 205, the folders under the "Documents" folder are considered for user classification 220.

At process block 705, the data displayed in the user interface such as web page 100 is mapped to a folder in the folder structure, for example, folder structure 205 imported into the mapping tool 200. The mapping tool 200 obtains the data objects containing the data displayed in the web page 100 and performs the mapping 130 between the data objects and the folder in the user classification 220. The user may map more than one data in source classification 210 to a folder in the user classification 220. But, a data in source classification 210 may not be mapped to more than one folder in the user classification 220.

At process block 710, a user interface object, for example a tab object, is created in the web page 100 for the mapped folders in the user classification 220. The tab object represents the user classification of data. The type of the user interface object created depends on how the classification is presented in the web page 100. If the web page 100 had displayed the classification of data as a tree hierarchy instead of tabs, then a node in a tree hierarchy is created for the folder. In another embodiment, if the classifications are displayed as a menu, then an item in a menu is created for the folder.

At process block 715, the mapped data is displayed in newly created user interface object, for example, tab "My News" 315 in "My News" web page 300. Now, based on the mapping, the tab "My News" 315 displays news 325 which was originally displayed as news 120 under "News→News By Industry" category in web page 100.

The "My News" web page 300 may be customized to enable or disable user defined classification of the data displayed. Also, the tabs created based on the user defined classification, for example, "My News" 315 and "Tech News" 320 may be differentiated from the original tabs "Home" and "News" in a number of ways including generating the "My News" 315 and "Tech News" 320 in different font, color, tab shape etc. In another embodiment, the "My News" web page 300 may be customized to have only the tabs "My News" 315 and "Tech News" 320 and not the original tabs.

Figure 8:
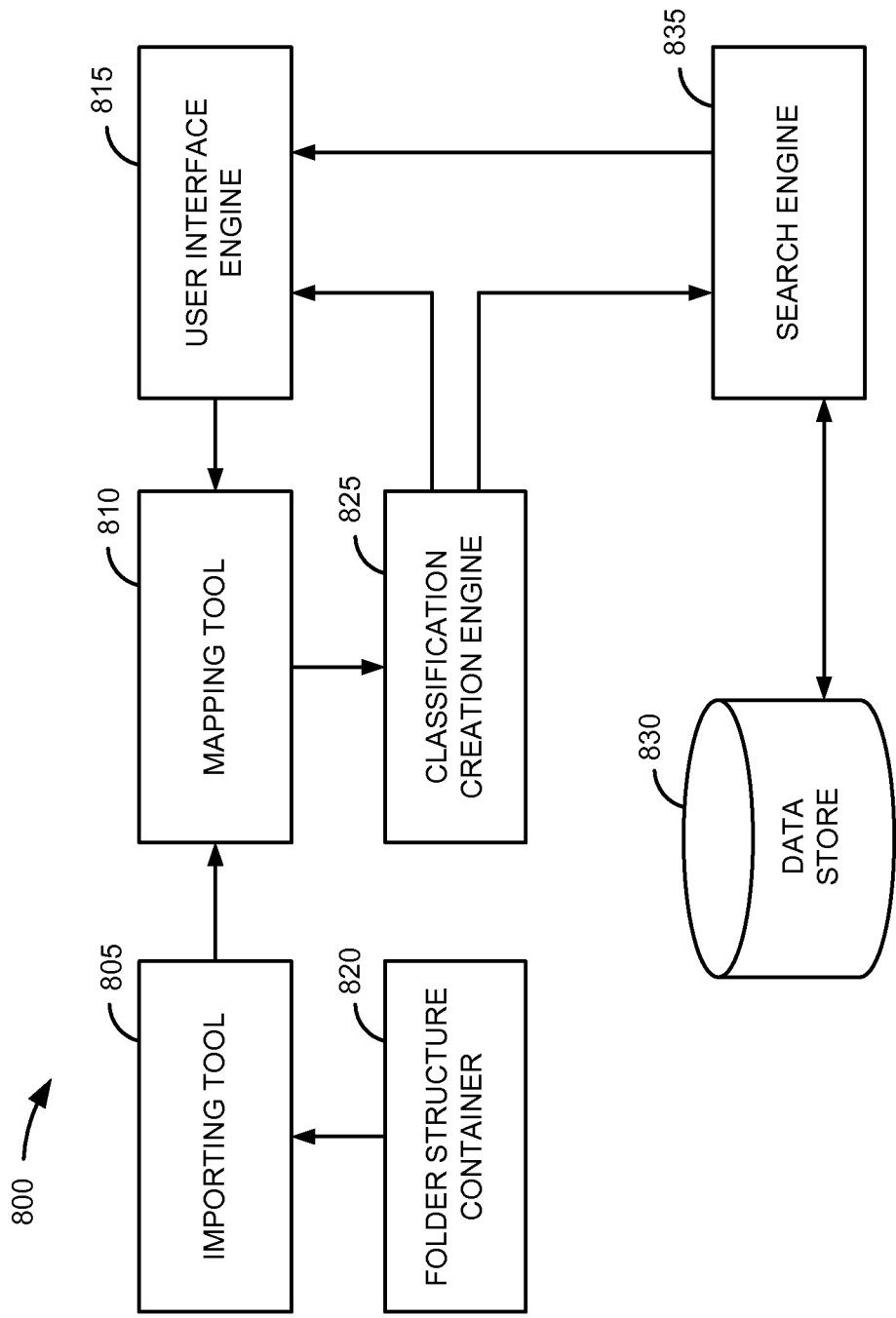
FIG. 8 is a block diagram of a system for classifying data displayed in a user interface based on a user defined classification according to an embodiment of the invention.

FIG. 8 is a block diagram of a system 800 for classifying data displayed in a user interface based on a user defined classification according to an embodiment of the invention. The system 800 includes a folder structure container 820 having a folder structure depicting the user defined classification. In one embodiment, the folder structure container 820 includes any system on which the user interface is being viewed, and executing an application associated with the user interface. However, the folder structure container 820 could reside anywhere in a network also including the system on which the user interface is being generated. The folder structure may be imported from an application such as Microsoft® Windows and Microsoft® Outlook.

An importing tool 805 imports the folder structure from the folder structure container 820 and provides the folder structure to a mapping tool 810. The mapping tool 810 obtains an original classification of data in the user interface such as web page 100 and provides them to user as source classification 210. Using the mapping tool 810, the user may map the data in source classification 210 to a folder in the user classification 220. The mapping tool 810 executes the mapping by extracting a data object containing the data and maps it to the folder in the user classification 220. A classification creation engine 825 obtains the mapping from the mapping tool 810 and creates a user interface object, for example, a tab object such as "My News" 315 representing the mapping. A user interface engine 815 generates a user interface, for example, "My News" web page 300 and displays the mapped data under the newly created tab "My News" 315.

The system 800 also includes a search engine 835 that performs a search in the application to retrieve news related to or containing a keyword, for example, "tech news" which is a name of the tab "Tech News" 320. The search result is displayed in the user interface, for example, search web page 600. In an embodiment, the search may be restricted to a data store 830 within the application. In another embodiment, the search may be performed outside the application as well. Examples of search engine 835 include a search engine of the application, google search provided by Google®, yahoo search provided by Yahoo®, and MSN search provided by Microsoft®.

Embodiments of the invention may include various steps as set forth above. The steps may be embodied in machine-executable program code which causes a general-purpose or special-purpose processor to perform certain steps. Alternatively, these steps may be performed by specific hardware components that contain hardwired logic for performing the steps, or by any combination of programmed computer components and custom hardware components.

Embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or any other type of machine-readable media suitable for tangibly storing electronic instructions. The machine readable medium can provide the instructions stored therein to a computer system comprising a processor capable of reading and executing the instructions to implement the method steps described herein.

It should be appreciated that reference throughout this specification to one embodiment or an embodiment means that a particular feature, structure or characteristic described in connection with the embodiment is included in at least one embodiment of the present invention. These references are not necessarily all referring to the same embodiment. Furthermore, the particular features, structures or characteristics may be combined as suitable in one or more embodiments of the invention.

Throughout the foregoing description, for the purposes of explanation, numerous specific details were set forth in order to provide a thorough understanding of the invention. It will be apparent, however, to one skilled in the art that the invention may be practiced without some of these specific details. For instance, a web browser was used in many of the examples above to illustrate and describe the principles of the invention but the invention is not limited to these examples. The detailed description as set forth above includes descriptions of method steps. However, one skilled in the art will understand that the order of the steps set forth above is meant for the purposes of illustration only and the claimed invention is not meant to be limited only to the specific order in which the steps are set forth. Accordingly, the scope and spirit of the invention should be judged in terms of the claims which follow.

What is claimed is:

1. A computer implemented method to present a reconfigured webpage based on user defined classifications, the method comprising:
   importing a folder structure defined in an application, the folder structure comprising a data object associated with a user defined classification of content of a webpage;
   providing an option to map, using the computer, one or more source data objects associated with a source classification of the content of the webpage to the data object associated with the user defined classification of the content of the webpage, wherein providing the option to map comprises:
      rendering the data object associated with the user defined classification of the content of the webpage;
      rendering the one or more source data objects associated with the source classification of the content of the webpage; and
      providing the option to map the one or more source data objects associated with the source classification to the data object associated with the user defined classification; and
   creating a user interface object based on mapping information of the one or more source data objects associated with the source classification and the data object associated with the user defined classification; and
   presenting the reconfigured webpage corresponding to the created user interface object.

2. The computer implemented method of claim 1, wherein the source data objects associated with the source classification is retrieved by accessing an application programming interface of the webpage.

3. The computer implemented method of claim 1, wherein creating the user interface object comprises creating the user interface object selected from a group consisting of a tab, a node in a tree hierarchy, and an item in a menu depicting the folder structure.

4. The computer implemented method of claim 1, wherein creating the user interface object comprises creating the user interface object with a classification name based on a name of the folder.

5. The computer implemented method of claim 1, wherein creating the user interface object comprises creating the user interface object in a hierarchy according to a hierarchy of the folder structure.

6. The computer implemented method of claim 1, wherein presenting the reconfigured webpage comprises:
   performing a search in the application with a classification name of the user interface object as a search keyword; and
   presenting a search result in a computer generated user interface including the reconfigured webpage.

7. The computer implemented method of claim 6, wherein performing the search in the application comprises performing the search using a search engine of the application.

8. An article of manufacture, comprising:
   a non-transitory machine readable medium comprising instructions to present a reconfigured webpage based on user defined classifications, the instructions which when executed by a machine cause the machine to:
      import a folder structure defined in an application, the folder structure comprising a data object associated with a user defined classification of content of a webpage;
      provide an option to map one or more source data objects associated with a source classification of the content of the webpage to the data object associated with the user defined classification of the content of the webpage, wherein providing the option to map comprises:
         rendering the data object associated with the user defined classification of the content of the webpage;
         rendering the one or more source data objects associated with the source classification of the content of the webpage; and
         providing the option to map the one or more source data objects associated with the source classification to the data object associated with the user defined classification;
      create a user interface object based on mapping information of the one or more source data objects associated with the source classification and the data object associated with the user defined classification; and
      present the reconfigured webpage corresponding to the created user interface object.

9. The article of manufacture in claim 8, wherein the source data objects associated with the source classification is retrieved by accessing an application programming interface of the webpage.

10. The article of manufacture in claim 8, wherein creating the user interface object comprises creating the user interface object selected from a group consisting of a tab object, a node in a tree hierarchy, and an item in a menu depicting the folder structure.

11. The article of manufacture in claim 8, wherein creating the user interface object comprises creating the user interface object with a classification name based on a name of the folder.

12. The article of manufacture in claim 8, wherein creating the user interface object comprises creating the user interface object in a hierarchy according to a hierarchy of the folder structure.

13. The article of manufacture in claim 8, wherein presenting the reconfigured webpage comprises:
   performing a search in the application with a classification name of the user interface object as a search keyword; and
   presenting a search result in a computer generated user interface including the reconfigured webpage.

14. The article of manufacture in claim 13, wherein performing the search in the application comprises performing the search using a search engine of the application.

15. A computer system to present a reconfigured webpage based on user defined classifications, the computer system comprising:
   at least one processor; and
   one or more memory devices communicative with the at least one processor, wherein the one or more memory devices includes:
      a folder structure container to provide a folder structure comprising a data object associated with a user defined classification of content of a webpage;
      an importing tool in communication with the folder structure container to import the folder structure defined in an application;
      a mapping tool in communication with the importing tool to map one or more source data objects associated with a source classification of the content of the webpage to the data object associated with the user defined classification of the content of the webpage, wherein mapping comprises:
         rendering the data object associated with the user defined classification of the content of the webpage;
         rendering the one or more source data objects associated with the source classification of the content of the webpage; and
         providing the option to map the one or more source data objects associated with the source classification to the data object associated with the user defined classification;
      a classification creation engine in communication with the mapping tool to create a user interface object based on the mapped one or more source data objects associated with the source classification and the data object associated with the user defined classification; and
      a user interface engine in communication with the classification creation engine to present the reconfigured webpage corresponding to the created user interface object.

16. The computer system of claim 15 further comprising a search engine in communication with the classification creation engine to perform a search in an application with a classification name of the user interface object as a search keyword and providing a search result.

* * * * *